UNITED STATES PATENT OFFICE.

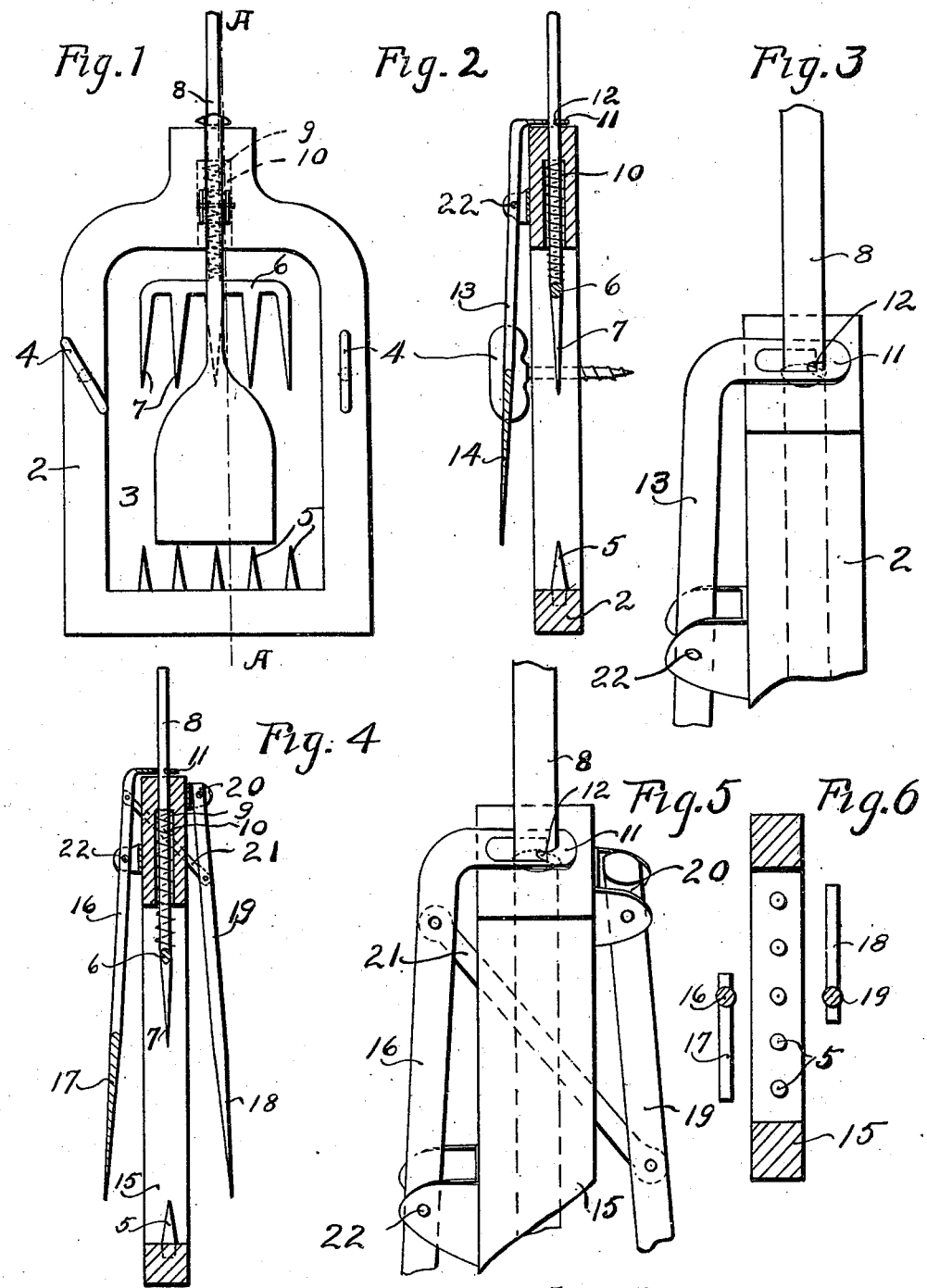

JOSEPH K. HARDING, OF ST. PAUL, MINNESOTA.

ANIMAL-TRAP.

996,599. Specification of Letters Patent. Patented June 27, 1911.

Application filed April 25, 1910. Serial No. 557,402.

*To all whom it may concern:*

Be it known that I, JOSEPH K. HARDING, a citizen of the United States, residing at St. Paul, in the county of Ramsey and State of Minnesota, have invented a new and useful Improvement in Animal-Traps, of which the following is a specification.

My invention relates to improvements in animal traps and has as its object a device which shall be cheap, simple and effective.

The principle of my device may be used in traps suited to animals of widely differing size and habits but the design which I have illustrated is particularly adapted to use in houses and buildings where rats and mice commonly cause annoyance and damage. This trap can be set over any runway in such buildings and easily secured to the woodwork, thus preventing the escape of the animal if it is not instantly killed by the opposing piercing prongs or teeth which form part of the essential features of my device.

In the drawings which illustrate this device and form part of the specification, Figure 1 is an elevation of my device; Fig. 2 is a section on the line A—A of Fig. 1; Fig. 3 is an enlarged detail of the tripping device; Fig. 4 is a sectional view of another application of the principles of my device; Fig. 5 is an enlarged view of the tripping action in this device, and Fig. 6 is a sectional plan on the line B—B, Fig. 4 showing the position of the tripping levers and contact blades.

In my device as illustrated 2 is a frame inclosing the opening 3 which is designed to fit over the mouth of an animal burrow or runway. This frame may be made of wood, metal, or any suitable material and may be fastened in position by thumb screws 4. In one side of the frame are fixed impaling points 5 sufficiently close together to prevent an animal from slipping between the points. A spear 6, having piercing points 7 and a shaft 8, is mounted loosely in the opening 3 opposite to the points 5 and so placed that when the spear is in its open or set position sufficient space is left between the points 5 and 7 for the passage of the animal for which the trap is designed. Attached to the spear 6 and the frame 2 is the coiled spring 9 shown in the recess 10 of the frame. This spring is made sufficiently strong to force the spear across the opening 3 and through the body of the animal which is passing through the opening at the time, at the same time forcing the animal against the equally sharp points 5 and impaling it thereon. The spear 6 is held in its set position by a trigger 11 in notch 12 in the shaft 8 of the spear. This trigger is integral with a tripping lever 13 mounted at 22 upon the frame 2. The tripping lever 13 has a contact blade 14 placed in front of the opening 3 and located over the mouth of the burrow when the trap is set in place, and adapted to obstruct, slightly, the passage of the animal as it passes through the trap and being moved thereby, trip the trigger 11 and release the spring 9, thus forcing the spear across the opening 3.

My device may be made as shown in Fig. 4. This trap has a frame 15 similar to frame 2, with points 5 and spear 6 identical. The same trigger 11 is used connecting with a tripping lever 16 which is mounted on the frame 15. This lever has a contact blade 17 so shaped as to leave a wider opening on one side than on the other. Opposite to this wider opening and on the other side of the frame is a second contact blade 18 attached to a second tripping lever 19 which is hinged at its end 20, to the frame 15. The tripping levers 16 and 19 are connected by a bar 21 which is hinged to the lever 17 at a point near the trip and to the lever 19 at a point below its end 20. The bar 21 is offset to avoid the recess 10, passes through a slot 23 in the frame 2, and by its arrangement prevents any movement of the lever 19 toward the frame 15 from tripping the trap, while any movement away from the frame such as would be caused by an animal passing through the trap from the opposite side, will trip the spearing device and impale the animal. In this manner a device is secured that will effectually capture an animal traveling in either direction. The efficacy of this device depends upon the staggered position of the contact blades and the connection of the tripping levers which allow the animal to pass by the lever on the side from which he approaches and operate the trip on the other side when the animal is in a position to receive the stroke of the spear.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. An animal trap, comprising, in combination, a spear shaft having a plurality of piercing points, a frame having an inclosed aperture and a sliding bearing for said spear shaft adapted to direct said spear across said aperture, a plurality of impaling points mounted in the aperture of said frame and adapted to coöperate with the spear points, a resilient member connecting said frame and spear shaft and adapted to force said spear across the aperture, a tripping lever having a blade at one end normally disposed across the aperture of the frame and a trigger at the other, embracing said shaft, and adapted to engage the same when in its raised position and prevent the action of the spring, whereby any movement of the blade is likely to release said shaft to the action of the spring.

2. In a tripping device for animal traps, a frame, a spring operated piercing spear mounted in said frame, a tripping lever mounted on said frame, having a tripping blade on one end normally disposed opposite the sprung position of said spear, and a trigger at the other end embracing said spear and adapted to engage the same and maintain it in its retracted position and to throw the spring of said spear into operation when the tripping blade is moved by an animal passing through said frame.

In testimony whereof, I have signed my name to this specification, in the presence of two subscribing witnesses.

JOSEPH K. HARDING.

Witnesses:
MARTIN H. ALBIN,
PAUL S. SMITH.

---

Copies of this patent may be obtained for five cents each, by addressing the "Commissioner of Patents, Washington, D. C."